(12) United States Patent
Dinkheller

(10) Patent No.: US 12,024,352 B2
(45) Date of Patent: Jul. 2, 2024

(54) FRESHNESS-RETAINING NEGATIVE PRESSURE CONTAINER FOR FOOD

(71) Applicant: ZWILLING J.A. HENCKELS AG, Solingen (DE)

(72) Inventor: Simon Dinkheller, Werne (DE)

(73) Assignee: ZWILLING J.A. HENCKELS AG, Solingen (DE)

( * ) Notice: Subject to any disclaimer, the term of this patent is extended or adjusted under 35 U.S.C. 154(b) by 288 days.

(21) Appl. No.: 17/421,384

(22) PCT Filed: Dec. 13, 2019

(86) PCT No.: PCT/EP2019/085028
§ 371 (c)(1),
(2) Date: Jul. 8, 2021

(87) PCT Pub. No.: WO2020/143994
PCT Pub. Date: Jul. 16, 2020

(65) Prior Publication Data
US 2022/0089350 A1  Mar. 24, 2022

(30) Foreign Application Priority Data
Jan. 11, 2019 (DE) ...................... 10 2019 000 133.8

(51) Int. Cl.
*B65D 81/20* (2006.01)
*A47J 47/10* (2006.01)
*B65D 43/02* (2006.01)

(52) U.S. Cl.
CPC .......... *B65D 81/2015* (2013.01); *A47J 47/10* (2013.01); *B65D 43/022* (2013.01);
(Continued)

(58) Field of Classification Search
CPC .............. B65D 81/2015; B65D 43/022; B65D 2543/00518; B65D 2543/00546; B65D 2543/00962; A47J 47/10; A47J 47/06
(Continued)

(56) References Cited

U.S. PATENT DOCUMENTS 2,116,421 A * 5/1938 Williams ........... B65D 41/0442
215/276
2,619,246 A * 11/1952 Staller .................. B65D 51/002
215/274
(Continued)

FOREIGN PATENT DOCUMENTS

AT          280519 B      4/1970
CN       105073593 A     11/2015
(Continued)

*Primary Examiner* — Chun Hoi Cheung
*Assistant Examiner* — Brijesh V. Patel
(74) *Attorney, Agent, or Firm* — Norman B. Thot

(57) ABSTRACT

A container for storing food includes a container wall with a top edge and a lid. The lid includes a lid edge with a sealing profile which contacts the top edge of the container wall when the container is closed, an opening with a valve which can have air be sucked therethrough when the container is closed so as to obtain a negative pressure inside the container, the negative pressure being lower than atmospheric pressure, a lid interior region, and a flexible profile which attaches the lid interior region to the lid edge so as to form a variable-height support of the lid interior region. The flexible profile maintains the lid interior region in an upper position if the negative pressure is not present and allows for a movement of the lid interior region into a lower position if the negative pressure is present.

9 Claims, 2 Drawing Sheets

(52) U.S. Cl.
CPC .............. *B65D 2543/00518* (2013.01); *B65D 2543/00546* (2013.01); *B65D 2543/00962* (2013.01)

(58) Field of Classification Search
USPC ............ 220/212.5, 694, 699–702, 790, 793, 220/254.7, 254.1, 752, 755, 801–803, 220/805–806, 601, 795–798, 791, 378, 220/367.1, 203.29, 203.01, 240, 231; 215/228, 396, 398, 400, 270, 260, 262; 217/56, 110, 98, 113–114; 206/524.8; 138/89; 137/511
See application file for complete search history.

(56) References Cited

U.S. PATENT DOCUMENTS

| | | | | |
|---|---|---|---|---|
| 3,414,160 A * | 12/1968 | Weber | ...................... | B65D 7/30 220/203.18 |
| 4,969,570 A * | 11/1990 | Harvey, Sr. | ............ | B65D 25/20 D9/434 |
| 5,125,530 A * | 6/1992 | Straub | ................ | B65D 43/0206 220/784 |
| 5,181,626 A * | 1/1993 | Daenen | ................ | B65D 43/021 220/255 |
| 5,791,506 A * | 8/1998 | Sheffler | .............. | B65D 43/0231 220/255 |
| 5,868,273 A * | 2/1999 | Daenen | .............. | B65D 43/0212 220/780 |
| 5,967,363 A * | 10/1999 | Allen | ..................... | B44D 3/128 220/733 |
| 6,035,769 A * | 3/2000 | Nomura | ............ | B65D 81/2038 219/730 |
| 6,364,152 B1 | 4/2002 | Poslinski et al. | | |
| 6,581,939 B1 * | 6/2003 | Theros | .................... | F16J 15/062 384/489 |
| 6,685,046 B2 * | 2/2004 | Ogino | ..................... | A47J 47/10 220/912 |
| 7,048,136 B2 * | 5/2006 | Havens | .............. | B65D 51/1644 222/509 |
| 7,390,043 B2 * | 6/2008 | Kraus | .................... | B62D 25/24 220/DIG. 19 |
| 7,648,041 B2 * | 1/2010 | Ueda | ................. | H01L 21/67126 220/323 |
| 8,418,870 B2 * | 4/2013 | Song | ................... | B65D 43/0202 220/795 |
| 8,813,991 B1 * | 8/2014 | Liu | ..................... | B65D 43/0212 220/780 |
| 8,899,443 B2 * | 12/2014 | Soibel | ................ | B65D 43/0233 220/795 |
| 10,138,046 B2 * | 11/2018 | Ho | ......................... | B65D 45/02 |
| 2002/0195455 A1 * | 12/2002 | Takahashi | .............. | B65D 53/02 220/806 |
| 2003/0209545 A1 * | 11/2003 | Lin | .................... | B65D 51/1683 220/203.11 |
| 2007/0095849 A1 | 5/2007 | Kim | | |
| 2007/0170190 A1 * | 7/2007 | Milesi | .................... | A45D 40/22 220/806 |
| 2009/0026205 A1 * | 1/2009 | Moon | .................. | B65D 43/022 220/378 |
| 2011/0121009 A1 | 5/2011 | Alvares et al. | | |
| 2012/0199582 A1 * | 8/2012 | Cai | .................... | B65D 21/0209 220/203.04 |
| 2012/0273488 A1 | 11/2012 | Kim | | |
| 2016/0000271 A1 | 1/2016 | Park | | |
| 2016/0003365 A1 * | 1/2016 | Park | ................... | B65D 81/2038 137/511 |
| 2021/0284398 A1 * | 9/2021 | Valderrama | .......... | B65D 43/022 |

FOREIGN PATENT DOCUMENTS

| | | |
|---|---|---|
| DE | 20 2005 009 608 U1 | 10/2005 |
| DE | 10 2012 024 996 B3 | 2/2014 |
| EP | 1 780 143 A2 | 5/2007 |
| JP | H08-156961 A | 6/1996 |
| JP | 2010-500246 A | 1/2010 |
| JP | 2010-536680 A | 12/2010 |
| JP | 2013-512753 A | 4/2013 |
| WO | WO 00/45688 A1 | 8/2000 |
| WO | WO 2004/099023 A1 | 11/2004 |

* cited by examiner

FRESHNESS-RETAINING NEGATIVE PRESSURE CONTAINER FOR FOOD

CROSS REFERENCE TO PRIOR APPLICATIONS

This application is a U.S. National Phase application under 35 U.S.C. § 371 of International Application No. PCT/EP2019/085028, filed on Dec. 13, 2019 and which claims benefit to German Patent Application No. 10 2019 000 133.8, filed on Jan. 11, 2019. The International Application was published in German on Jul. 16, 2020 as WO 2020/143994 A1 under PCT Article 21(2).

FIELD

The present invention relates to a container for storing food, the container having an upper horizontal lid, the outer edge of which has a sealing profile all the way around, the sealing profile contacting the top edge of the container when the container is closed, the lid having an opening with a valve through which air can be sucked out of the closed container to obtain a lower pressure (negative pressure) inside the container, the pressure being lower than atmospheric pressure.

BACKGROUND

Containers to keep stored food fresh have previously been described that can be hermetically closed with an upper lid which has an opening with a valve function where a pump, in particular a manually operated pump, is connected to generate a negative pressure in the interior of the container at which pressure the storage life of food inside the container is extended. Such food storage containers are often referred to as "vacuum" containers, although only a sub-atmospheric pressure and no full vacuum can be achieved.

The previously described vacuum food storage containers do not exhibit any indicating device/manometer or indicator so that it cannot be easily determined whether or not a negative pressure exists inside the container.

SUMMARY

An aspect of the present invention is to provide an improved vacuum food storage container of the kind referred to above where it is readily apparent if a negative pressure exists inside the container and if any existing negative pressure is low or high.

In an embodiment, the present invention provides a container for storing food which includes a container wall comprising a top edge and an upper horizontal lid. The upper horizontal lid comprises a lid edge which comprises a sealing profile which is configured to contact the top edge of the container wall when the container is closed, an opening which comprises a valve which is configured to have air be sucked therethrough when the container is closed so as to obtain a lower pressure (negative pressure) inside the container, the lower pressure (negative pressure) being lower than atmospheric pressure, a lid interior region, and a flexible profile which is configured to attach the lid interior region to the lid edge so as to form a variable-height support of the lid interior region. The flexible profile is configured to maintain the lid interior region in an upper position if the lower pressure (negative pressure) is not present and to allow for a movement of the lid interior region into a lower position if the lower pressure (negative pressure) is present.

BRIEF DESCRIPTION OF THE DRAWINGS

The present invention is described in greater detail below on the basis of embodiments and of the drawings in which.

DETAILED DESCRIPTION

Figure 1:
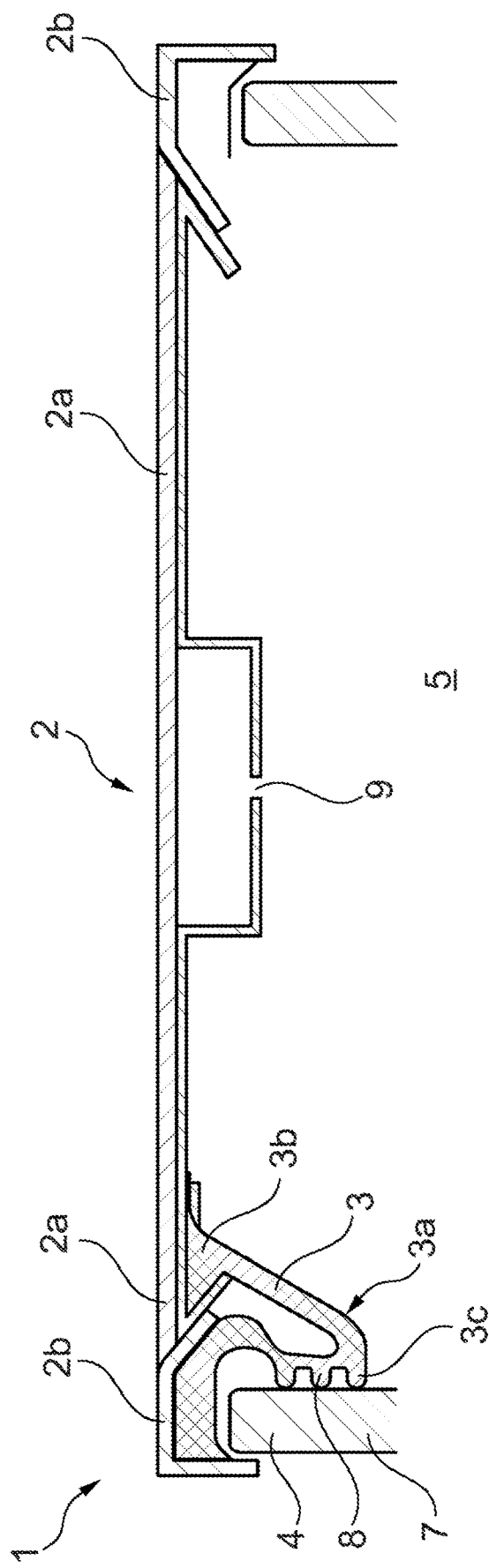
FIG. 1 shows a first embodiment in a vertical section through the upper area of the freshness-retaining negative pressure container for food according to the present invention with the lid interior region 2a being in its lowest position as a result of the negative pressure.

The present invention provides that the lid has an interior region which is completely surrounded by a lid edge, the lid interior region being attached to the lid edge by a flexible profile extending all the way around, the flexible profile forming a variable-height support of the lid interior region and keeping the lid interior region in an upper position if no negative pressure is present and allowing the lid interior region to move to a lower position if negative pressure is present.

The negative pressure generated inside the container pulls the movably supported lid interior region downward so that the user can readily determine if a negative pressure exists inside the container. The support of the lid interior region can be designed so that the lid interior region moves less far downward if a slight negative pressure exists than if a higher negative pressure exists. The design and the support of the lid interior region are particularly simple and ease to handle.

A particularly simple production and assembly is achieved if the flexible profile that keeps the lid interior region at the lid edge is formed in one piece with the sealing profile that seals the lid edge at the top edge of the container.

To achieve a high tightness of the lid at the inner edge of the container, it is particularly advantageous if, in the lower position of the lid interior region, the sealing profile is deformed so that the sealing area contacting the inner edge of the container is extended.

To achieve a high tightness, it is also advantageous if the sealing profile has, in the sealing area contacting the inner edge of the container, a wall thickness that is thinner than the wall thickness of the upper section of the sealing profile. In this respect, it is proposed that the sealing profile, in particular the sealing area contacting the inner edge of the container, exhibits nubs, beads or formations.

The sealing profile may also be designed so that, when the lid interior region is in its lower position, the profile forms a seal between the lid edge and the top edge of the container and at the same time forms a seal between the lid edge and the lid interior region. The sealing profile therefore has a sealing effect at both of its ends in the presence of negative pressure.

Two embodiments of the present invention are shown in the drawings and are described in greater detail below.

The container 1 for storing food has a horizontal, round, oval or roughly rectangular bottom (which is not shown in the drawings) with a surrounding container wall 7. The interior space 5 of the container 1 is open to the top and can be closed by a horizontal lid 2, at the outer edge of which a surrounding sealing profile 3 is attached which is made of an elastic plastic material such as silicone or acrylic polymer and which can, for example, be produced by an extruder as an endless profile and cut-to-size.

The lid 2 has a lid interior region 2a which is fully surrounded by a lid edge 2b. The lid 2 also has an opening 9 with a valve through which air can be sucked out of the container 1 when closed to obtain a lower pressure (negative pressure) inside the container 1, the pressure being lower than the atmospheric pressure. The lid interior region 2a is connected with the lid edge 2b through the upper inner area 3b of the sealing profile 3, the sealing profile 3 forming a seal between the lid edge 2b and the top edge 4 of the container wall 7.

The sealing profile 3 is attached with its upper outer edge area 3d at the bottom side of the lid edge 2b and forms with its bottom outer side 3c and its bottom area 3a an outer sealing area which, when the lid 2 is closed or placed on the container 1, sealingly contacts the inner surface of the top edge 4 of the container wall 7.

The ring-shaped sealing profile 3 has a V-shaped cross-section open to the top, the upper outer edge area 3d of which is attached, in particular adhered, to the bottom side of the lid edge 2b, and the upper inner edge area 3b of which is attached, in particular adhered, to the bottom side of the outer edge of the lid interior region 2a.

The lower ring-shaped bottom area 3a of the sealing profile 3 open to the top bounds the interior space 5 of the container 1 so that the sealing profile 3 is exposed to the negative pressure existing in the container 1. The negative pressure effects a movement of the bottom area 3a, and in particular of the lateral bottom outer side 3c of the sealing profile 3, to the outside so that the sealing area of the bottom outer side 3c of the sealing profile 3 is extended and the sealing pressure is increased.

In an advantageous embodiment of the present invention, the wall thickness of the sealing area of the bottom out side 3c contacting the inner edge of the container 1 can, for example, be thinner than the wall thickness of the upper inner area 3b and of the upper outer edge area 3d of the sealing profile 3. The sealing profile 3, in particular the sealing area of the bottom outer side 3c contacting the inner edge of the container 1, can also have nubs, beads 8 or formations.

Figure 2:
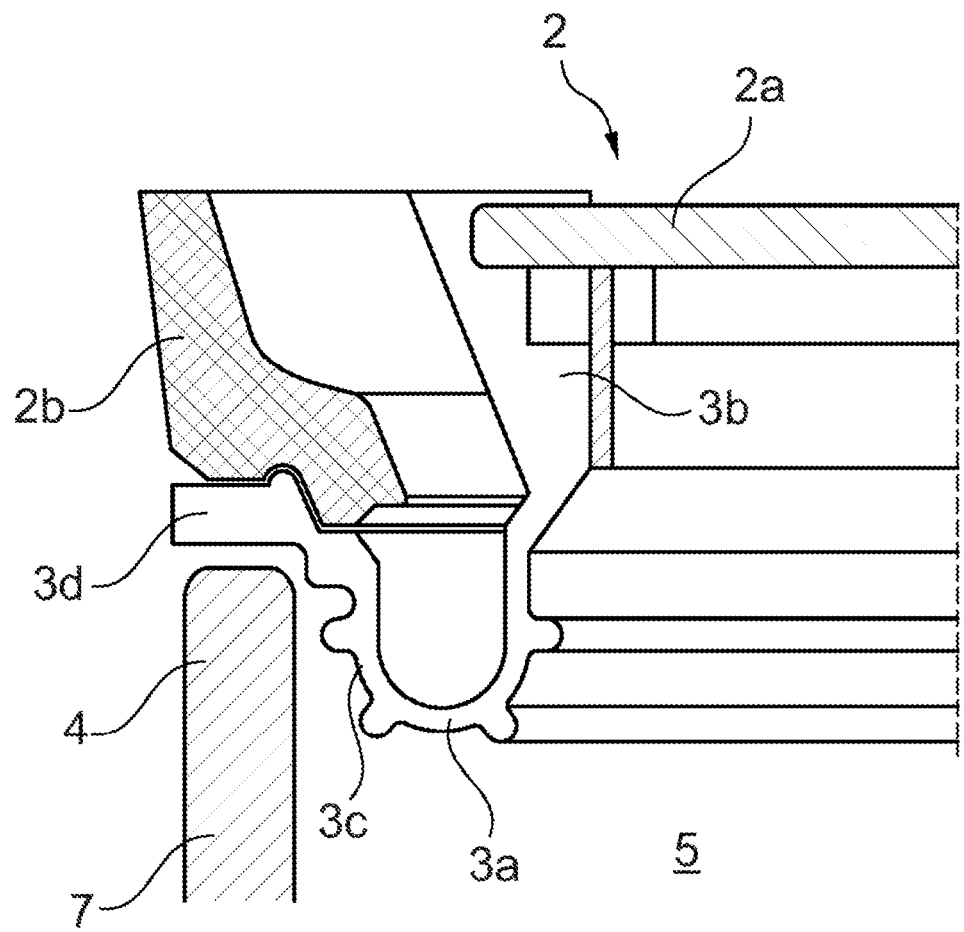
FIG. 2 shows a second embodiment where the sealing profile forms a seal between the lid edge and the top edge of the container and at the same time forms a seal between the lid edge and the lid interior region.

In an alternative embodiment as shown in FIG. 2, the sealing profile 3 is attached to the lid interior region 2a so that it forms a sealing area with its upper inner area 3b which, when the lid 2 is closed or placed on the container 1, sealingly contacts the lid edge 2b and the lid interior region 2a.

In both embodiments, the container bottom, the container wall 7 and the lid 2 can be made of a variety of materials, in particular plastic, metal or glass.

The present invention is not limited to embodiments described herein; reference should be had to the appended claims.

LIST OF REFERENCE NUMERALS

1 Container
2 Lid
2a Lid interior region
2b Lid edge
3 Sealing profile
3a Bottom area
3b Upper inner area
3c Bottom outer side
3d Upper outer edge area
4 Top edge
5 Interior space
7 Container wall
8 Bead
9 Opening with a valve

What is claimed is:

1. A container for storing food, the container comprising:
   a container wall comprising a top edge; and
   an upper horizontal lid comprising:
      a lid edge which comprises a sealing profile, the sealing profile being configured to contact the top edge of the container wall when the container is closed,
      an opening which comprises a valve which is configured to have air be sucked therethrough when the container is closed so as to obtain a lower pressure (negative pressure) inside the container, the lower pressure (negative pressure) being lower than atmospheric pressure,
      a lid interior region, and
      a flexible profile which attaches the lid interior region to the lid edge so as to form a variable-height support of the lid interior region,
   wherein,
      the flexible profile is configured to maintain the lid interior region in an upper position relative to the lid edge if the lower pressure (negative pressure) is not present and to allow for a movement of the lid interior region into a lower position relative to the lid edge if the lower pressure (negative pressure) is present.

2. The container as recited in claim 1, wherein the flexible profile is formed in one piece.

3. The container as recited in claim 1, wherein,
   the container wall further comprises an inner edge,
   the sealing profile further comprises a sealing area which is configured to contact the inner edge of the container wall, and
   in the lower position of the lid interior region, the sealing profile is deformed so as to extend the sealing area which contacts the inner edge of the container wall.

4. The container as recited in claim 3, wherein,
   the sealing profile further comprises a sealing area wall thickness in the sealing area which contacts the inner edge of the container wall,
   the sealing profile further comprises an upper section which comprises an upper section wall thickness, and
   the sealing area wall thickness is thinner than the upper section wall thickness.

5. The container as recited in claim 3, wherein the sealing profile further comprises nubs, beads or formations.

6. The container as recited in claim 3, wherein the sealing area of the sealing profile comprises nubs, beads or formations.

7. The container as recited in claim 1, wherein the sealing profile is further configured to provide a seal between the lid edge and the lid interior region.

8. The container as recited in claim 1, wherein the lid edge and the lid interior region are not integral with each other.

9. The container as recited in claim 1, wherein the flexible profile is arranged between the lid edge and the lid interior region.

* * * * *